United States Patent [19]
Takahashi

[11] 3,930,171

[45] Dec. 30, 1975

[54] LOW POWER, FAST RISE TIME CURRENT DRIVER FOR INDUCTIVE LOAD

[75] Inventor: Ricardo M. Takahashi, Canoga Park, Calif.

[73] Assignee: Ampex Corporation, Redwood City, Calif.

[22] Filed: July 15, 1974

[21] Appl. No.: 488,315

[52] U.S. Cl. ........... 307/270; 307/255; 340/174 TB

[51] Int. Cl.²...............H03K 17/64; H03K 17/16; H03K 17/20; G11C 17/02

[58] Field of Search ........... 307/270, 282, 255, 313; 340/174 TB

[56] References Cited

UNITED STATES PATENTS

| | | | |
|---|---|---|---|
| 3,284,644 | 11/1966 | Dormer et al. | 340/174 TB X |
| 3,343,147 | 9/1967 | Ashwell | 340/174 TB |
| 3,564,297 | 2/1971 | Elsner | 340/174 TB X |
| 3,626,393 | 12/1971 | Call | 340/174 TB X |

FOREIGN PATENTS OR APPLICATIONS

| | | | |
|---|---|---|---|
| 1,195,582 | 6/1970 | United Kingdom | 340/174 TB |
| 4,519,017 | 6/1970 | Japan | 307/270 |

*Primary Examiner*—John S. Heyman
*Assistant Examiner*—L. N. Anagnos

[57] ABSTRACT

A low power, fast rise time current driver for an inductive load such as a sense-inhibit line of a magnetic core memory includes a transformer having a secondary thereof coupled to drive a load and the primary coupled to be driven by a constant voltage during steady state conditions. A charged capacitor is initially coupled in series with the primary drive voltage and as the capacitor discharges there is a gradual, smooth transition from a high initial voltage which induces a rapid load current rise time to a steady state voltage level induced by the voltage source. An advantageous charging circuit for the capacitor permits the utilization of energy stored by the inductive load immediately prior to termination of the load drive current, to be used to charge the capacitor. A constant load drive current having a fast rise time without substantial overshoot or critical timing requirements is thus attained without the dissipation of substantial power by the current driver circuitry.

13 Claims, 2 Drawing Figures

LOW POWER, FAST RISE TIME CURRENT DRIVER FOR INDUCTIVE LOAD

BACKGROUND OF THE INVENTION

1. Field of the invention

This invention relates to a current driver circuit for driving an inductive load such as a sense-inhibit line of a magnetic core memory with a current waveform having a rapid rise time.

2. History of the prior art

A conventional three wire 3D magnetic core memory includes a plurality of bit positions with a matrix of magnetic cores at each bit position. Row drive wires inductively couple a corresponding row of magnetic cores from each bit position and Y drive wires inductively couple a corresponding column of magnetic cores from each bit position. As information is written into or read from a given address location in the memory, a single pair of row and column drive wires is selected in response to address signals to drive a core located at the intersection of the selected row and column wires in each bit position of the memory with a switching current. For example, an 18 word memory would have 18 bit positions with one core at each bit position being simultaneously selected by the energization of one row drive wire and one column drive wire. A sense-inhibit line pair inductively couples all of the cores at each bit position to provide the third dimension of memory selection. During a read cycle, sense amplifiers are connected to each of the sense-inhibit windings to detect the presence or absence of a switching pulse thereon as a selected core within each bit position is driven with coincident drive currents of a magnitude sufficient to induce magnetic flux switching. During a write cycle one selected core at each bit position is driven with sufficient current to switch the core to a one state unless a current of opposite polarity is passed through the sense-inhibit line at a given bit position to reduce the net current at a given selected core below the magnitude of current required for switching. A separate sense-inhibit current is thus required at each bit position of an addressed word location for which a logic zero is to be written. As many as 18 separate sense-inhibit currents may be required for a given write operation while only two drive currents are required. For this reason, a substantial portion of the energy consumed by a magnetic core memory is consumed by these sense-inhibit currents and the current driver circuitry therefor.

Each sense-inhibit wire pair typically couples several thousand cores and thus presents a substantially inductive load to the current drivers therefor. In order to meet the rapid cycle time requirement of present day core memories, it is necessary for the row and column drive currents and thus the inhibit currents also, to have rapid initial rise times. The initial current slope, $dI_L/dt$, for an inductive load is proportional to the drive voltage divided by load inductance. However, the steady state current is equal to the drive voltage divided by the series resistance and is substantially independent of the load inductance. A conventional driver circuit for a core memory sense-inhibit line pair thus requires a large magnitude voltage source driving a series combination of a large resistance and the sense-inhibit line pair. The large magnitude voltage source permits a steep initial current slope in order to attain a fast rise time while the large resistance limits the steady state current to a desired value. However, this arrangement has the disadvantage of dissipating a very substantial amount of power through the series resistor. This dissipated power serves no useful purpose in memory operation, provides a drain on the power supply, provides a load on the air conditioning system which must remove heat from the memory, increases the failure rate of memory components because of higher operating temperatures, and is multiplied by the number of bit positions into which a logic zero is to be written. Furthermore, the sudden changes of great magnitude in power supply current create ground noise which interferes with memory operation.

It thus becomes desirable to eliminate the series resistor of the sense-inhibit current driver circuits and minimize the power consumption and current levels of these circuits. One such scheme drives the sense-inhibit line pairs with the secondary winding of a transformer having two primary windings. During the initial rise time of the sense-inhibit line drive currents, both windings of the transformer primary are energized. This double energization produces a large voltage at the secondary to overcome the load inductance and produce a load current with a fast rise time. As the load current reaches the desired steady state magnitude, one of the primary windings is switched off and the other remains energized to provide a secondary voltage of sufficient magnitude to maintain the desired steady state load current. However, it is extremely difficult to switch off the extra primary winding at the exact time that the load current reaches the desired steady state magnitude. This timing problem is exacerbated by the fact that the transit times and gate delays which are encountered before control signals reach each separate bit position are extremely difficult to predict. These timing variations, coupled with transistor turn-off time variations from transistor to transistor and over a wide temperature range introduce timing uncertainties that may be of the same order of magnitude as a typical 100n sec. rise time period. Circuitry for increasing timing predictability adds undesirable expense and occupies extra circuit board area. It thus becomes difficult to exactly predict the time at which the extra primary winding should be turned off. This inaccuracy in the supplemental primary winding turn-off time combines with the rapid deenergization of the extra primary winding to induce voltage oscillations or ringing in the sense-inhibit lines. This ringing generates electromagnetic noise which may interfere with memory operation, prevents prediction of the magnitude of the sense-inhibit currents for cancellation of the coincident drive currents and may increase the recovery time required before small voltage switching signals may be sensed on the sense-inhibit line during a subsequent read cycle. Undesirably large disturb noises may be generated in the cores due to substantial sense-inhibit current overshoot or excessive rise times resulting from these timing uncertainties.

SUMMARY OF THE INVENTION

A current driver in accordance with the invention drives an inductive load such as the sense-inhibit line of a magnetic core memory with a fast rise time, constant magnitude steady state current and includes a voltage source, a gradually changing voltage booster, and circuitry connecting the voltage source and voltage booster to the load such that an initial high voltage state of the voltage booster element permits an initial high voltage to be applied to the inductive load. The booster voltage gradually decreases during the period of the load current rise time and consequently the load drive voltage is gradually and smoothly reduced to a steady state voltage level which is dependent upon the magnitude of the voltage source. Use of a charge storage element such as a precharged capacitor for the voltage booster results in a drive current waveform having a steep initial slope without need for critical timing relationships and substantial amounts of power are not dissipated in the current driver circuit. In addition, energy stored by the inductive load immediately prior to the termination of load current may be utilized to at least partially charge the charge storage element in preparation for a subsequent load current cycle.

More particularly, a current driver in accordance with the invention includes a transformer having a secondary winding connected to drive an inductive load and a primary winding having a first terminal coupled through a first switch to a voltage supply and a second terminal coupled through a diode to ground. During steady state operation primary current flows through the diode and the first switch to the supply voltage to provide steady state primary and secondary voltages and thus a constant load current. The initial rapid load current rise time is attained by selectively switching a charged capacitor into the primary winding circuit to provide an initial large magnitude voltage across the primary winding. As the capacitor gradually discharges, the voltage applied across the primary winding is smoothly and gradually decreased without a sudden step-like change from the initial high voltage to the steady state voltage provided by the voltage source and the output voltage of the secondary winding changes in a corresponding manner. The size of the capacitor and the magnitude of the precharge voltage may be selected to cause the capacitor to reach a discharged condition at which it has substantially no affect on the voltages across the transformer primary and secondary windings at approximately the same time as the load current reaches the desired steady state value at the end of the load current rise time period. The gradual decrease in primary voltage prevents substantial oscillations or overshoot in the load drive current even though the discharge time for the capacitor may not exactly match the load current rise time due to variations in the load inductance. Furthermore, the driver circuit does not require the dissipation of any substantial amounts of power through a series resistor. Furthermore, the circuit tends to be self compensating with respect to timing variations. A faster rise time tends to discharge the capacitor faster to reduce the supplementary voltage and slow the rise time while the supplementary voltage remains higher longer to boost the load current when the rise time tends to be slow.

The power consumption of the driver circuit may be reduced even further by at least partially recharging the capacitor with energy stored by the inductive load at the termination of load current. As current in the primary winding is terminated, the transformer and load inductance causes a substantial negative voltage to appear at the output terminal of the secondary winding. A diode connected in series between the secondary winding and the capacitor permits the capacitor to be charged through the diode in response to this inductive voltage kick which occurs at turn-off. During the initial rise time when the capacitor is connected in series with the primary winding, this diode is reversed biased and prevents any direct effect of the capacitor on the secondary winding.

BRIEF DESCRIPTION OF THE DRAWINGS

A better understanding of the invention may be had from a consideration of the following detailed description, taken in conjunction with the accompanying drawings in which.

DETAILED DESCRIPTION

Figure 1:
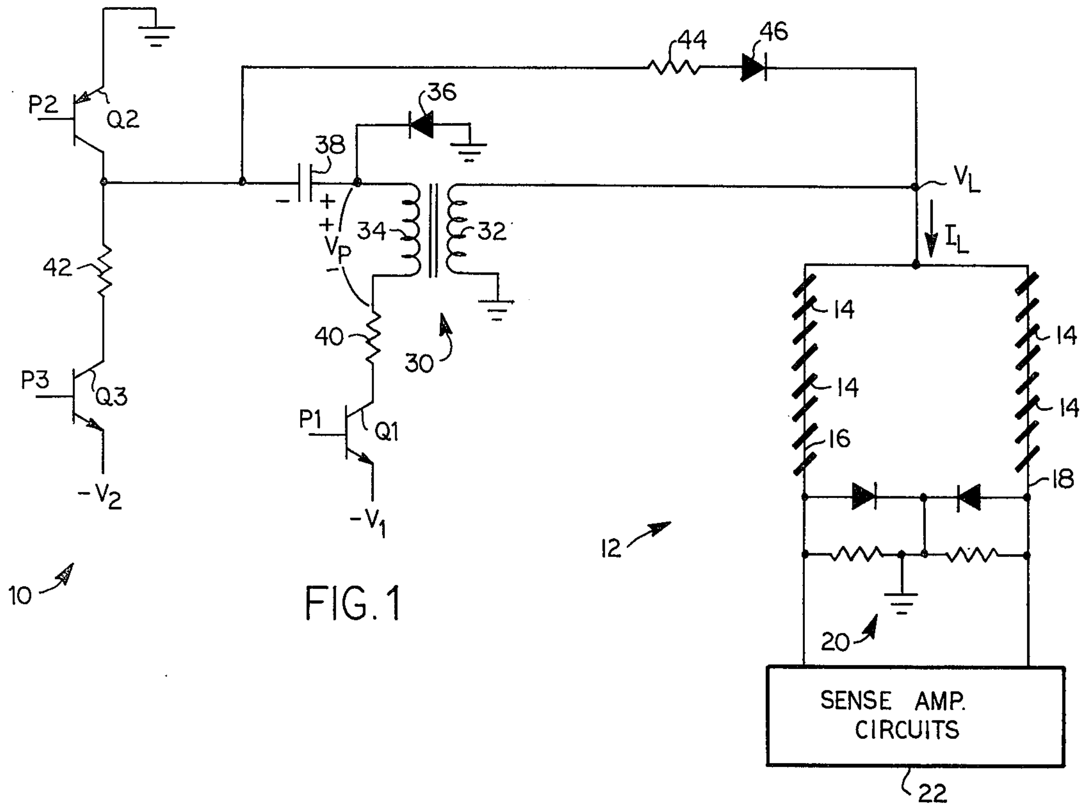
FIG. 1 is a block diagram and schematic representation of a current driver circuit in accordance with the invention for driving an inductive load with a current having a fast rise time.

A current driver circuit 10 in accordance with the invention is connected to drive an inductive load with a current $I_L$ which has a steep initial slope dI/dt to produce a short load current rise time period and a substantially constant steady state value. In a particularly useful example, the inductive load 12 is the sense-inhibit winding of a digital core memory having cores 14 of a given bit position inductively coupled by wires 16, 18 of a sense-inhibit line pair. The sense-inhibit line pair 16, 18 is terminated at an end opposite the current drive end by connection to a termination network 20 and sense amplifier circuits 22. The sense-inhibit line pair 16, 18 typically inductively couples several thousand of the cores 14 and therefore presents a load with a substantial inductance. Furthermore, the individual wires 16, 18 are typically several feet long, are very small in diameter, and typically present a resistance of several ohms. During a read cycle one of the cores 14 is driven with a switching current of a first polarity while the sense amplifier circuits 22 are connected to sense a small voltage pulse on the order of a few tens of millivolts which is generated if a selected core 14 switches. During a write cycle one of the cores 14 is driven with a switching current of a second polarity opposite the first polarity. If a one is to be written into the memory the current driver 10 is not activated and the selected core is switched to the one state. However, if a zero is to be written into the selected core 14, the driver circuit 10 is activated to drive the sense-inhibit lines 16, 18 with an inhibit current which inductively couples the selected core 14 with a polarity opposite the polarity of the write current to cause a net current to inductively couple the selected core 14 which is not sufficient to switch the core to the one state. The selected core 14 thus remains in the zero state to store a logic zero bit of information.

A memory write cycle can be divided into three major time periods. These periods include a current rise time period, a constant current switching time period, and a current fall time period. The current rise and fall time periods consume memory cycle time to reduce the operating speed of a memory without contributing significantly to memory operation and are therefore desirably kept as short as possible. However, the core switching signals which appear on the sense-inhibit lines 16, 18 during a subsequent read cycle are quite small in comparison to voltages which are induced on these lines by an inhibit current during a write cycle. It thus becomes desirable to limit the generation of voltage oscillations or ringing signals that may appear on the sense-inhibit lines 16, 18 when they are driven with sharp signal transitions. For this reason, and because the sense-inhibit lines 16, 18 typically couple more cores than the X and Y drive lines, the minimum rise and fall time periods are normally determined by the sense-inhibit line 16, 18 requirements rather than the X and Y core selection drive circuit requirements.

The driver circuit 10 meets the above requirements of driving an inductive load with a constant steady state current having a rapid rise time without overshoot or excessive ringing. The circuit 10 includes a transformer 30 having a secondary winding 32 and a primary winding 34. In this example the primary winding 34 has twice as many turns as the secondary winding 32, although different turns ratios may be employed with suitable adjustment for primary voltages and currents. The use of a turns ratio greater than one reduces the magnitude of power supply sudden current transitions and consequently reduces resulting ground noise problems. A first terminal of the secondary winding 32 is connected to drive the inductive load with a voltage $V_L$ and a second terminal of secondary winding 32 is connected to ground. A first terminal of primary winding 34 is coupled to the cathode of a diode 36 as well as to a first terminal of a capacitor 38. The anode of diode 36 is coupled to ground. A second terminal of the primary winding 34 of transformer 30 is coupled through a resistance 40 to the collector of an NPN transistor Q1 having the emitter thereof coupled to a negative voltage source $-V_1$. The resistance 40 has a value of approximately 0 to 3 ohms and provides an impedance matching resistance for compensating for small load resistance or transformer turns ratio variations. The resistance 40 dissipates a relatively small amount of power because of its small size and because the two-to-one turns ratio of transformer 30 causes the primary winding 34 to conduct only half as much current as secondary winding 32 during steady state conditions. A second terminal of capacitor 38 opposite the first terminal is coupled to the collector of a PNP transistor switch Q2 having its emitter coupled to ground and also through a resistance 42 to the collector of a transistor switch Q3 having the emitter thereof coupled to a negative voltage source $-V_2$. In general the voltage source $-V_2$ may be selected to provide any desired initial charge for capacitor 38, but in this example it will be assumed that voltage $-V_2$ is equal to voltage $-V_1$. The resistance 42 limits the capacitor charging current which passes through transistor switch Q3 and in this example has a value of 20 ohms. An additional charging circuit for capacitor 38 which includes the series combination of a 10 ohm resistance 44 and a diode 46 is optionally connected between the second terminal of capacitor 38 and the first terminal of secondary winding 32, which is the inductive load drive point. The diode 46 is oriented with the cathode thereof coupled to the load drive point to conduct a current which will charge the second terminal of capacitor 38 negative relative to the first terminal as the voltage $V_L$ at the load drive point goes negative at the termination of load current $I_L$. Control signals P1, P2 and P3 are connected to the bases of transistor switches Q1, Q2 and Q3 respectively to selectively turn said switches on and off.

Figure 2:
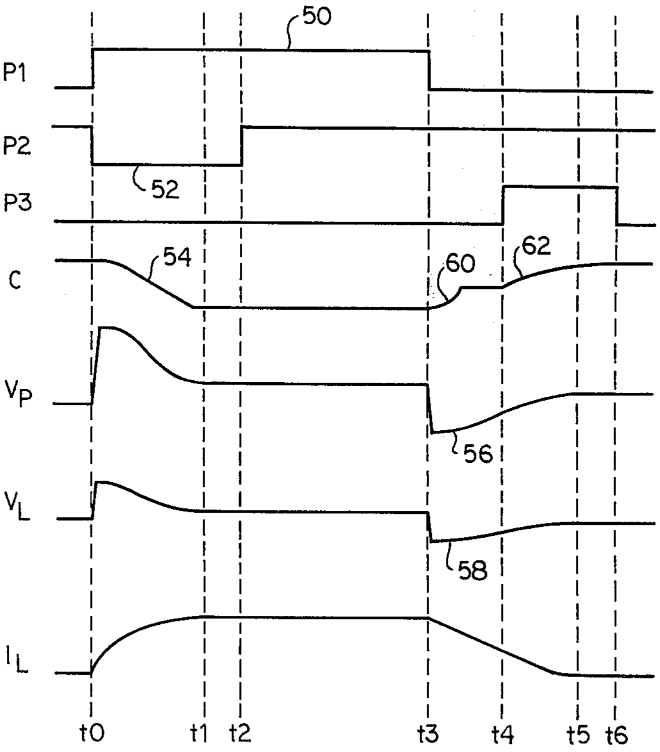
FIG. 2 is a graphical representation of signal waveforms which are related to the operation of the current driver circuit shown in FIG. 1.

The operation of driver circuit 10 may be best understood with reference to the signal waveforms shown in FIG. 2. Each write cycle during which the current driver 10 generates an inhibit current includes a load current rise time period T0-T1, a steady state current period T1-T3, and a load current fall time period T3-T5. As an inhibit current cycle is initiated at time T0, a positive going pulse 50 is generated on signal P1 to turn on transistor switch Q1 and couple the second terminal of primary winding 34 to voltage $-V_1$. At the same time a negative going pulse 52 on signal P2 turns on transistor switch Q2 to couple the second terminal of precharged capacitor 38 to ground. The charge across capacitor 38 reverse biases diode 36 and causes a voltage magnitude of $V_1$ plus $V_2$ to be applied across the primary winding 34 of transformer 30. In this example $-V_1$ equals $-V_2$ equals $-15$ volts. A total voltage $V_T$ equals 30 volts is thus applied across the primary winding 34 shortly after time T0. Because of the two-to-one turns ratio of transformer 30, this 30 volt primary voltage induces a 15 volt initial secondary voltage, $V_L$ across secondary winding 32 to drive the sense-inhibit lines 16, 18 of inductive load 12. Shortly after time T0 the load current is very small permitting load resistance to be ignored, and the load current $I_L$ has an initial slope, $dI_L/dt = (V_1 + V_2)/2L$, where L is the effective inductance of load 12. As illustrated by a rise time portion 54 of curve C which shows the voltage across capacitor 38, capacitor 38 is initially charged to 15 volts and then at time T0 begins to discharge toward 0 volts increasingly rapidly as the load current $I_L$ increases throughout the rise time period. With the value of capacitor 38 properly selected, 0.0039$\mu$f in this example, capacitor 38 discharges to approximately 0 volts as the load current $I_L$ reaches its steady state value at the end of the rise time at time T1. Even if changes in the load inductance cause the discharge of capacitor 38 to occur at other than the exact time at which load current $I_L$ reaches steady state value, the voltage across capacitor 38 gradually decreases during the rise time period so that any voltage errors are small and do not appreciably affect the voltage across primary winding 34 at time T1 or induce substantial ringing oscillations in the circuit 10 and load 12. The capacitor 38 thus operates as a voltage booster to provide an initial high voltage across the primary winding which gradually reduces toward a steady state voltage throughout a substantial portion of the load current rise time period.

As capacitor 38 discharges at time T1, diode 36 begins conducting the current for primary winding 34. This current passes through resistance 40 and transistor switch Q1 to voltage $-V_1$ of $-15$ volts. Under steady state conditions a current of approximately 350 milliamps passes through primary winding 34 with a voltage thereacross of approximately 13 volts after voltage drops across diode 36, resistance 40 and transistor Q1 are accounted for. The resulting 6.5 volt output $V_L$ from secondary winding 32 drives the resistive portion of the approximately 8 ohm load 12 with approximately 5 volts after the diode voltage drop of the termination network 20 is subtracted, resulting in a current of about 700 milliamps which divides equally between the two sense-inhibit lines 16, 18.

At some time T2 subsequent to time T1, signal P2 is raised to turn off transistor switch Q2 and decouple the second terminal of capacitor 38 from ground. At a time T3, the signal P1 goes low to turn off transistor switch Q1 and interrupt the drive current for primary winding 34. As the current through primary winding 34 is terminated the inductances of primary winding 34, secondary winding 32 and load 12 cause a first negative voltage waveform 56 to be generated across the primary winding 34 and a second negative voltage waveform 58 to be generated across secondary winding 32. As voltage $V_L$ becomes negative at the termination of load current $I_L$ at time T3, capacitor 38 begins to charge through resistor 44 and diode 46 as indicated by waveform 60 until the magnitude of voltage $V_L$ reduces to a value which is less than the magnitude of the voltage which results from the accumulated charge across capacitor 38. At a time T4 a positive voltage is impressed on signal P3 to turn on transistor switch Q3 and connect the second terminal of capacitor 38 to voltage $-V_2$ and complete the charging of capacitor 38 as indicated by signal waveform 62. At time T5 the load current falls to approximately zero amperes to complete the sense-inhibit circuit current cycle. At some time T6 prior to the time T0 for the subsequent sense-inhibit current cycle signal P3 goes low to turn off transistor switch Q3.

While there has been shown and described a particular embodiment of a current driver circuit in accordance with the invention for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

What is claimed is:

1. A current driver for driving a sense-inhibit line of a magnetic core memory comprising:

- a transformer having a primary winding with first and second terminals and a secondary winding which is connectable to drive a sense-inhibit line;
- a first switch connected in series between the first terminal of the primary winding and a voltage source to impress a voltage across the primary winding on command;
- a capacitor having a first terminal and a second terminal coupled to the second terminal of the primary winding;
- a diode having a first terminal coupled to ground and a second terminal coupled to the second terminal of the primary winding and the second terminal of the capacitor;
- a second switch coupled between the first terminal of the capacitor and a voltage supply; and
- means for selectively charging the capacitor and closing the second switch whereby the charged capacitor increases the voltage impressed across the primary winding and discharges through the primary winding to a voltage which has substantially no effect upon the voltage impressed across the primary winding.

2. The current driver as set forth in claim 1 above, further comprising a third switch coupled between the first terminal of the capacitor and a voltage supply and a resistance coupled between the third switch and the first terminal of the capacitor.

3. The current driver as set forth in claim 1 above, further comprising a second diode and a resistance coupled in series between the sense-inhibit line and the first terminal of the capacitor, the diode being oriented to charge the capacitor in response to a voltage induced on the sense-inhibit line when current in the primary winding is rapidly decreased as the first switch is opened.

4. A current driver for driving the sense-inhibit winding of a core memory comprising:

- a transformer having a secondary winding coupled between a sense-inhibit winding of a core memory and ground and a primary winding with first and second terminals;
- a first switch coupled between the first terminal of the primary winding and a first voltage source;
- a first diode coupled between the second terminal of the primary winding and ground, the first diode being oriented to conduct current through the primary winding in response to the closure of the first switch;
- a capacitor having a first terminal coupled to the second terminal of the primary winding and a second terminal;
- a second switch coupled between the second capacitor terminal and a second voltage source;
- a third switch coupled between the second capacitor terminal and a third voltage source; and
- a second diode coupled between the second capacitor terminal and a coupling of the transformer secondary winding to a sense-inhibit winding; the second diode being oriented to charge the capacitor in response to an inductive kickback voltage which is generated when the first switch is opened to terminate the passage of current through the primary winding.

5. The current driver as set forth in claim 4 above, wherein the second voltage source is at ground potential.

6. The current driver as set forth in claim 4 above, wherein the first and third voltage sources are of the same polarity relative to ground.

7. The current driver as set forth in claim 4 above, further comprising a first resistance coupled in series with the first switch between the first terminal of the primary winding and the first voltage source.

8. The current driver as set forth in claim 7 above, further comprising a second resistance coupled in series with the second diode.

9. The current driver as set forth in claim 8 above, further comprising a third resistance coupled in series with the third switch between the second capacitor terminal and the third voltage source.

10. The current driver as set forth in claim 4 above, wherein the primary winding contains more turns than the secondary winding.

11. The current driver as set forth in claim 9 above, wherein the first and third switches are NPN transistors having their base terminals connected to first and third control inputs respectively, and the second switch is a PNP transistor having the base terminal thereof connected to a second control input.

12. A current driver circuit for driving an inductive load with a greater voltage during a load current rise time period than during a subsequent steady state load current period, the driver circuit comprising a voltage source; a capacitor; circuitry operating in response to memory control signals to selectively couple the voltage source and the capacitor to the load with the capacitor in an initial state of charge in a manner causing the capacitor to discharge and the load to be driven with an initial voltage which decreases in magnitude to a voltage dependent upon the voltage source as the capacitor discharges over a period of time which generally corresponds to a desired load current rise time, the load drive voltage remaining substantially constant for a second period of time following the load current rise time; and a charging circuit coupled to charge the capacitor, the charging circuit utilizing energy stored by the inductive load at a time immediately prior to the termination of load current to charge the capacitor as load current is terminated.

13. The driver circuit as set forth in claim 12 above, wherein the coupling circuitry includes a transformer having a primary to secondary winding turns ratio greater than one with the capacitor and voltage source being selectively coupled to the primary winding and the secondary winding being coupled to the load.

* * * * *